Dec. 19, 1939.　　　L. C. SPENCER　　　2,184,006
TROLLEY SPLICER
Filed Oct. 27, 1937
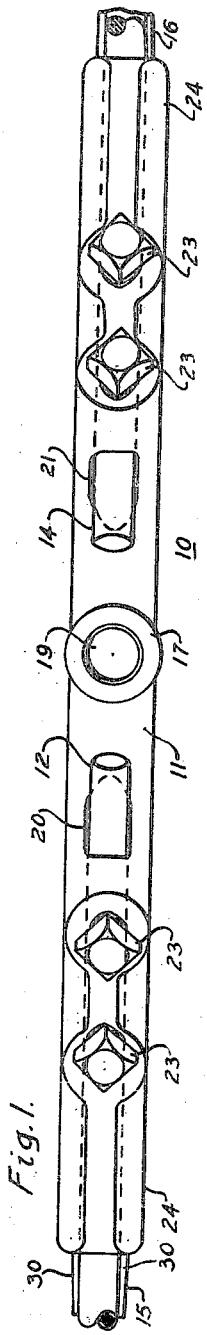
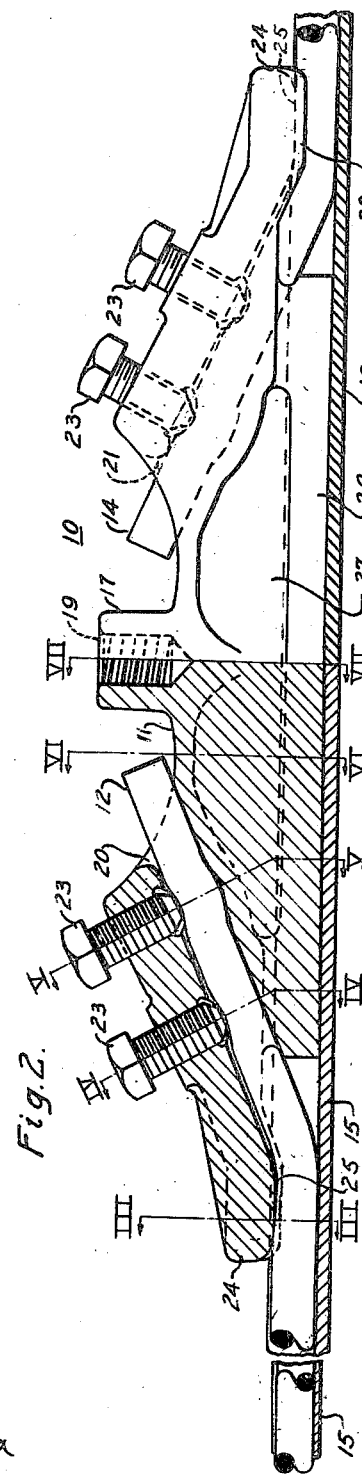
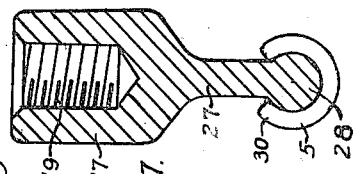
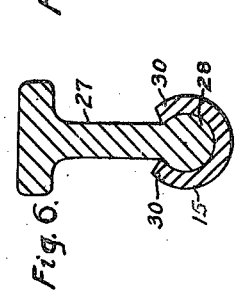
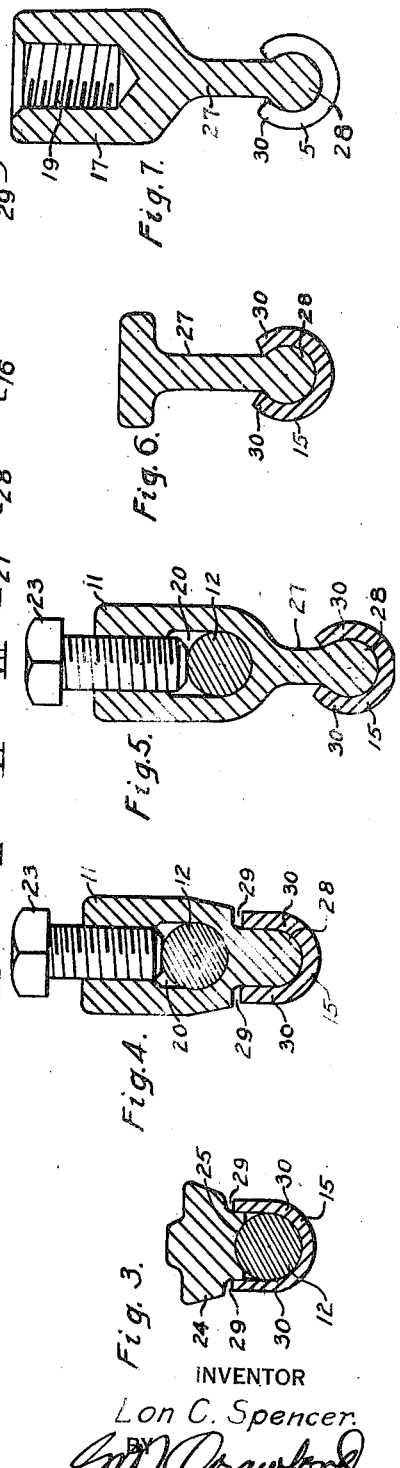
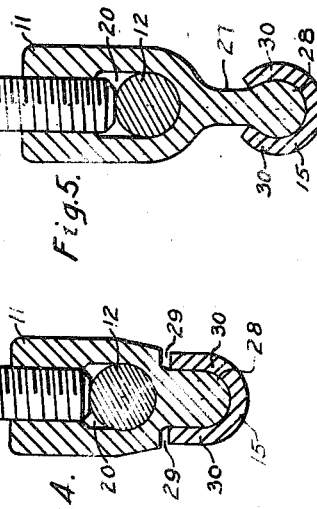
WITNESSES:
N. F. Susser
G. V. Giolma
INVENTOR
Lon C. Spencer.
BY M. Crawford
ATTORNEY Patented Dec. 19, 1939

2,184,006

UNITED STATES PATENT OFFICE 2,184,006

TROLLEY SPLICER

Lon C. Spencer, Indianapolis, Ind.

Application October 27, 1937, Serial No. 171,327

4 Claims. (Cl. 191—44)

My invention relates, generally, to overhead trolley systems, and it has reference, in particular, to a splicer for use in overhead trolley systems.

Heretofore, where it has been found necessary to provide a joint in the trolley wire of an overhead trolley system, it has been customary to utilize splicers of a type where the body member is not only adapted to securely grip the adjacent ends of the trolley wires, but further provides a runner portion for guiding a current collector thereover. As it has generally been found desirable in securing the adjacent ends of the trolley wires to bend the trolley wire upwards through the body member of the splicer, it has been customary to provide upstanding lips on the lower side of the splicer adjacent to the ends, for peening about the trolley wires where they enter the splicer, in an effort to provide a smooth wearing surface for a current collector passing from the trolley wire onto the runner portion of the splicer.

In such a construction, parts of the splicer itself, namely, the upstanding lips and the runner portion, will be subjected to direct wear through the passage of current collectors thereover. It may be seen that when these parts become worn, it will be necessary to renew the entire splicer, of which the lips and runner portion are an integral part. This operation is decidedly expensive and involves a great amount of labor, as the body member of the splicer normally sustains the full pull of the trolley wire, and the adjoining trolley wires must be sufficiently supported while the worn splicer is being removed and the new one installed.

Since the trolley wire is firmly gripped in a rigid body member in the conventional type of splicer, and since portions of the trolley wire adjacent to the splicer generally assume a catenary curve, efforts have been made to design splicers which will relieve the trolley wire of additional stresses incurred by bending of the trolley wire adjacent to the splicer. This bending is caused by the current collector continually raising the conductor as it approaches the splicer and then lowering the conductor as it passes on. Such bending causes minute fatigue cracks to originate between adjacent crystals in the conductor, which continue to grow as the conductor is subjected to further bending, and finally cause a mechanical failure thereof.

It is, therefore, generally an object of my invention to provide a splicer for overhead trolley systems wherein a renewable flexible approach and runner member provides a smooth wearing and approach surface for a clamping member portion of the splicer.

A more specific object of my invention is to provide a streamlined splicer for overhead trolley systems wherein the body member thereof is protected from wear by the use of a flexible renewable runner member and approach member having a minimum cross-section throughout the length of the splicer.

Another object of my invention is to provide a splicing member for overhead trolley systems wherein a sectionalized runner member is adapted to cooperate with the trolley wire, grooved seating members and body member of the splicer to provide a smooth wearing surface.

Yet another object of my invention is to provide a streamlined splicer for overhead trolley systems wherein a sectionalized renewable runner member and approach member is secured in fixed engagement with the trolley wires and reduced cross-sectional portions of a trolley wire clamping member by being pressed into engagement therewith, to provide a simple, effective and durable splicer which shall be easy to manufacture, economical and inexpensive to maintain.

A further object of my invention is to provide a splicer for trolley wires having a clamping member and extended flexible approach members cooperative with the trolley wires and clamping member to provide a smooth streamlined approach and runner portion therefor, which protects and reinforces the trolley wires and assists in damping vibration thereof.

Other objects will, in part, be obvious and, in part, appear hereinafter.

My invention, accordingly, is disclosed in the embodiments thereof shown in the accompanying drawing, and comprises the features of construction, combination of elements and arrangement of parts which will be exemplified in the construction hereinafter set forth, the scope of the application being indicated in the appended claims.

For a more complete understanding of the nature and scope of my invention, reference may be had to the following detailed description taken in connection with the accompanying drawing, in which:

Figure 1 is a plan view of a trolley splicer embodying a preferred form of my invention;

Fig. 2 is a side elevation view, partly in section, of the trolley splicer of Fig. 1;

Fig. 3 is an enlarged sectional view taken along the line III—III of Fig. 2;

Fig. 4 is an enlarged sectional view taken along the line IV—IV of Fig. 2;

Fig. 5 is an enlarged sectional view along the line V—V of Fig. 2;

Fig. 6 is an enlarged sectional view taken along the line VI—VI of Fig. 2; and

Fig. 7 is an enlarged sectional view taken along the line VII—VII of Fig. 2.

Referring particularly to Figs. 1 and 2, it may be seen that in practicing my invention, I prefer to use a trolley splicer 10, comprising generally, a clamping member 11 adapted for clamping securely the adjacent ends of trolley wires 12 and 14, and a renewable wearing sheath which may, for instance, comprise a plurality of independently renewable-wear members 15 and 16, preferably of U-shaped cross-section. These members are disposed to be relatively flexible, may be placed about the underside of the clamping member 11 and extend along the trolley wires 12 and 14, being pressed into engagement therewith to provide an uninterrupted flexible approach armor and wearing surface for the trolley wire splicer.

It may be seen from further reference to Figs. 1 and 2 that the clamping member 11 of the splicer may have a centrally disposed mounting boss 17, integrally formed therewith on the upper side, and provided with a threaded opening 19 for attaching the splicer to the supporting structure of the overhead trolley system. To provide for securing adjacent ends of the trolley wires 12 and 14, upwardly inclined longitudinal openings 20 and 21 may be provided through the body of the clamping member 11, adjacent to the ends thereof. Set screws 23, or other means well known in the art, may be provided for firmly engaging the trolley wires 12 and 14 in their respective openings and securing them in fixed engagement therein.

Referring particularly to Fig. 3 it may be seen that integral seating portions 24 may be provided adjacent to the ends of the clamping member of the splicer in alignment with the openings 20 and 21, said seating portions having longitudinal grooves 25 on the lower side thereof for seating a trolley wire in order to align it in operating relation with the clamping member 11. A central web portion 27 having a beaded flange 28 on the lower edge in alignment with the adjacent trolley wires 12 and 14 may be provided on the lower side of the clamping member 11 and integral therewith, between the openings 20 and 21. Recessed edge portions 29 may be provided along the lower edges of the clamping member 11 of the splicer as is clearly shown in Figs. 3 and 4, to facilitate securing the wear members to the clamping member.

The upstanding edges 30 of the wear members, which may comprise longitudinal sections 15 and 16 having an essentially U-shaped cross-section, are disposed to fit in these recessed edge portions 29, thus providing a renewable runner and approach member for the splicer having a minimum cross-section and offering the least possible resistance to the passage of a current collector. By utilizing a material of relatively high conductivity, such as copper or the like, for forming portions of a renewable runner and approach member, and more preferably providing such material in the form of rolled strips which may be relatively flexible, extended wear members 15 and 16 may be made to securely grip the wire and clamping member of the splicer, and provide not only a renewable wearing surface for the splicer, but further provide a flexible wear and supporting sheath for the trolley wires 12 and 14, adjacent to the splicer 10. Such a sheath has been found to greatly increase the life of the trolley wire by distributing the stresses incurred in bending of the conductor and damping out vibrations set up therein, thus reducing failure of the conductor through fatigue, as well as reducing the mechanical wear of the trolley wire immediately adjacent to the splicer.

Referring to the cross-section views shown in Figs. 3, 4, 5, 6 and 7, it may be seen that the wear member 15 which is provided by securing upstanding edges 30 thereof in pressed engagement with the trolley wire 12, recessed portion 29 of the seating member 24 and beaded flange 28 of the central web portion 27 of the splicer, may thereby be securely held in engagement with the clamping member of the splicer. By the upper edges 30 of the U-shaped sheath 15 being so bent inwardly about the trolley wire and reduced cross-section portion of the web 27, an interlocking of the upstanding edges 30 of the wear member 15 with the clamping member 11 is provided, and the renewable wear member 15 is thereby prevented from moving relative to the clamping member 11.

By providing a splicer wherein the clamping member 11 provides clamping means only for the trolley wires and is not subjected to any wear from current collectors, it may be seen that replacements, due to wear, will be limited to the renewable wear portions 15 and 16, which by virtue of their construction in being merely secured to the clamping member in pressed engagement, are readily renewable without affecting the support of the overhead trolley system and are economical to replace.

Further, in so constructing a splicer that the runner portions are formed of a material and applied in a manner which permits a relatively large degree of flexibility thereof, it may be seen that I have to a large degree reduced the concentration of bending stresses in adjacent portions of the trolley wire and have also limited the vibrations set up therein, thereby reducing failures thereof. The trolley wire, which it may be realized is both difficult and expensive to replace, may thereby have a greatly extended period of use, thus effecting savings in material, time and money, in a manner both simple and effective.

Since certain changes may be made in the above construction, and different embodiments of the invention may be made without departing from the spirit thereof, it is intended that all subject matter contained therein and shown in the accompanying drawing shall be considered as illustrative and not in a limiting sense.

I claim as my invention:

1. A trolley wire splicer comprising, a rigid body member having mounting means therefor and means for securing trolley wires thereto, integral wire seating members adjacent each end of the body member having a width substantially equal to that of said trolley wires for aligning the trolley wires, a relatively thin central web member having an enlarged edge portion of substantially the width of one of the trolley wires positioned in alignment therewith, and a plurality of separate wear sheaths of relatively high conductivity having the top side portions thereof pressed about the enlarged edge portion of the body member and one of the trolley wires to mechanically interlock said sheaths with the wire, the seating members and said enlarged portions to independently secure the wear sheaths to the body member and prevent longitudinal movement thereof with respect to the body member.

2. A splicer for overhead trolley wires comprising, in combination, a unitary body member having a mounting boss integral therewith and upwardly inclined longitudinal openings through the ends of said body member to receive the ends of the trolley wires, grooved wire seating members integral with the body member and having a width substantially equal to that of the trolley wire for positioning the trolley wires in relation with the end openings, means for securing the trolley wires in said openings, a relatively thin central web portion having an enlarged lower flange portion of substantially the same width as a trolley wire disposed in alignment with the adjacent trolley wires, and a runner member comprising a plurality of renewable wearing sheaths of high conductivity having the top side portions thereof pressed into interlocking engagement with said trolley wires, seating members and enlarged lower flange portion of the web portion to prevent longitudinal movement of the wearing sheaths and provide a smooth and uniform path for a current collector.

3. A trolley wire splicer comprising, a body member having means for securing trolley wires thereto, trolley wire seating members adjacent each end of the body member having a width substantially equal to that of the trolley wires, a central web member having an enlarged edge of substantially the width of the trolley wires positioned in alignment therebetween, and a pair of separate runner members each having upstanding sides positioned about the enlarged edge, a seating member and a portion of a trolley wire with the top portions of the upstanding sides thereof crimped about the enlarged edge and the trolley wire to mechanically interlock the runner members with the trolley wire, seating member and enlarged edge and secure the runner member in fixed relation to the body member.

4. In a trolley wire splicer the combination, of a body member having means for securing trolley wires thereto, wire seating members adjacent the ends of the body member for aligning the trolley wires having a width substantially equal to the width of a trolley wire, a central web having an enlarged edge in alignment with the trolley wires of a width substantially equal to that of the trolley wires, and a pair of independently renewable U-shaped wear sheaths positioned with the upstanding sides thereof about the enlarged edge, seating members and trolley wires and having the top portions of the sides pressed inwardly about the enlarged edge and the trolley wire to mechanically interlock the sheaths about the seating members so as to separately secure the sheaths to the body member and prevent longitudinal movement thereof with respect to the body member.

LON C. SPENCER.